United States Patent
Kell et al.

(10) Patent No.: US 11,364,635 B2
(45) Date of Patent: Jun. 21, 2022

(54) CONTROLLING A ROBOT IN AN ENVIRONMENT

(71) Applicant: ROLLS-ROYCE plc, London (GB)

(72) Inventors: James Kell, Nottingham (GB); Bilal M. Nasser, Derby (GB); Amir Rabani, Nottingham (GB)

(73) Assignee: Rolls-Royce plc, London (GB)

( * ) Notice: Subject to any disclaimer, the term of this patent is extended or adjusted under 35 U.S.C. 154(b) by 503 days.

(21) Appl. No.: 16/270,877

(22) Filed: Feb. 8, 2019

(65) Prior Publication Data
US 2019/0262995 A1 Aug. 29, 2019

(30) Foreign Application Priority Data
Feb. 28, 2018 (GB) ...................................... 1803251

(51) Int. Cl.
*B25J 9/16* (2006.01)

(52) U.S. Cl.
CPC ............ *B25J 9/1697* (2013.01); *B25J 9/1666* (2013.01); *B25J 9/1625* (2013.01); *G05B 2219/40613* (2013.01)

(58) Field of Classification Search
CPC ...... B25J 9/1664; B25J 9/1692; B25J 9/1697; B25J 9/1666; B25J 9/1625; B25J 9/1694; B25J 13/089; G05B 2219/40613
See application file for complete search history.

(56) References Cited

U.S. PATENT DOCUMENTS

| | | | |
|---|---|---|---|
| 6,728,582 B1 | 4/2004 | Wallack | |
| 8,111,904 B2 | 2/2012 | Wallack et al. | |
| 8,861,411 B2 | 10/2014 | Ju et al. | |
| 10,166,676 B1* | 1/2019 | Hudson | B25J 9/1612 |
| 10,617,271 B2* | 4/2020 | Lindhe | A47L 9/009 |
| 11,127,202 B2* | 9/2021 | Krishna | G06K 9/6218 |
| 2011/0230894 A1 | 9/2011 | Simaan et al. | |
| 2015/0009214 A1* | 1/2015 | Lee | G06T 17/10 345/420 |
| 2016/0228296 A1 | 8/2016 | Woodley et al. | |

(Continued)

FOREIGN PATENT DOCUMENTS

| | | |
|---|---|---|
| EP | 2821872 | 1/2015 |
| EP | 3266572 A2 | 1/2018 |

(Continued)

OTHER PUBLICATIONS

Great Britain search report dated Aug. 17, 2018, issued in GB Patent Application No. 1803251.6.

(Continued)

*Primary Examiner* — Robert T Nguyen
(74) *Attorney, Agent, or Firm* — Shumaker & Sieffert, P.A.

(57) ABSTRACT

There is provided a method of controlling a robot within an environment comprising: i) receiving, from a 3D scanner, data relating to at least a portion of the environment for constructing a 3D point cloud representing at least a portion of the environment; ii) comparing the 3D point cloud to a virtual 3D model of the environment and, based upon the comparison, determining a position of the robot; then iii) determining a movement trajectory for the robot based upon the determined position of the robot. Also provided is a control apparatus and a robot control system.

15 Claims, 5 Drawing Sheets

(56) References Cited

U.S. PATENT DOCUMENTS

2018/0009109 A1* 1/2018 Norton .................. B25J 9/1697
2019/0139255 A1* 5/2019 Shih ..................... H04N 5/2257

FOREIGN PATENT DOCUMENTS

| GB | 2552019 A | 1/2018 |
| KR | 101782317 | 9/2017 |
| WO | 2004096502 | 11/2004 |
| WO | 2015106799 A1 | 7/2015 |
| WO | 2017059263 | 4/2017 |

OTHER PUBLICATIONS

Perez et al., Robot Guidance Using Machine Vision Techniques in Industrial Environments: A Comparative Review, Published Mar. 5, 2016, 26 pgs.

Extended European Search Report from counterpart EP Application No. 19154239.8 dated Aug. 2, 2019, 10 pgs.

Response to Extended European Search Report from counterpart EP Application No. 19154239.8 dated Aug. 2, 2019, filed Mar. 2, 2020, 52 pgs.

Extended Search Report from counterpart European Application No. 19154239.8 dated Sep. 20, 2021, 6 pp.

* cited by examiner

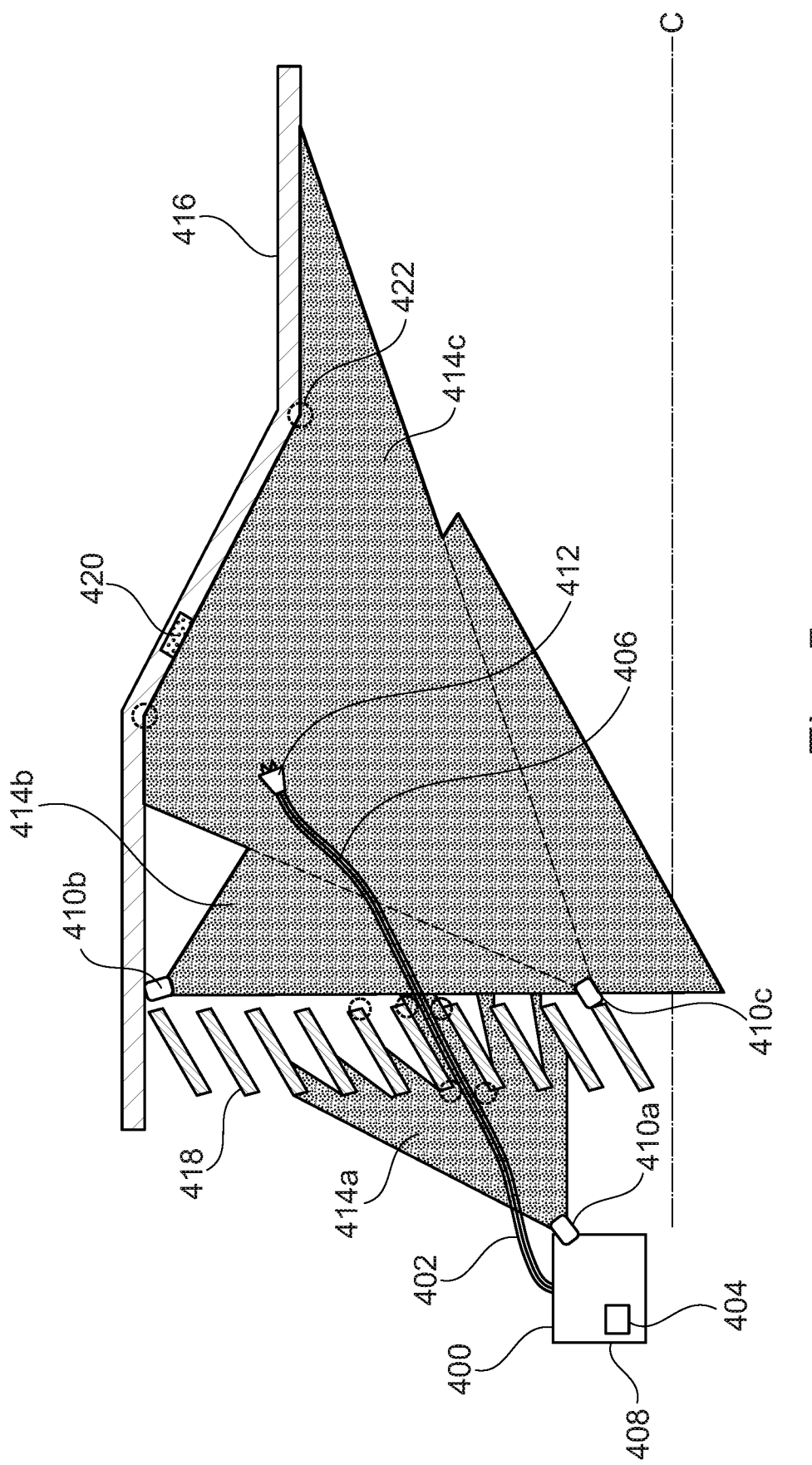

CONTROLLING A ROBOT IN AN ENVIRONMENT

CROSS-REFERENCE TO RELATED APPLICATIONS

This specification is based upon and claims the benefit of priority from UK Patent Application Number 1803251.6 filed on 28 Feb. 2018, the entire contents of which are incorporated herein by reference.

BACKGROUND

Technical Field

The present disclosure concerns the control of robots in environments and, in particular, controlling robots in confined environments with automated control regimes.

Description of the Related Art

In some fields, it is known to utilise robots to perform tasks which were conventionally performed by humans. Robots are typically utilised in environments which are difficult to access or hazardous to humans. For example, robots can be used to disarm explosive devices and to decommission nuclear reactors without putting the operator at risk. In other examples, remote surgery can be performed with a small robot which allows minimally-invasive internal procedures to be carried out.

In precise applications like these, robots are typically operated manually by a skilled user who can control the robot in order to navigate to the appropriate location and perform the necessary task or tasks. For example, a camera may be provided on the robot so that the operator can see the environment in which the robot is located and input control commands which are suitable to move the robot and undertake actions. However, manual control of robots results in the possibility of human error, which can be undesirable or dangerous dependent upon the environment in which the robot is operating. Furthermore, even if assisted control is provided, the robots used in these applications typically have multiple degrees of freedom and non-linear joints to produce the required articulation. Accordingly, there can be significant uncertainty regarding the robot displacement, which may reduce the operational performance.

Therefore, it will be understood that it would be desirable to provide improved control of robots within environments.

SUMMARY

According to a first aspect there is provided a method of controlling a robot within an environment comprising: i) receiving, from 3D scanner, data relating to at least a portion of the environment for constructing a 3D point cloud representing at least a portion of the environment; ii) comparing the 3D point cloud to a virtual 3D model of the environment and, based upon the comparison, determining a position of the robot; then iii) determining a movement trajectory for the robot based upon the determined position of the robot.

The 3D point cloud may also be known as a depth map. The method may further comprise providing the virtual 3D model. The method may further comprise capturing the data relating to at least a portion of the environment with the 3D scanner.

The 3D scanner may be a robot 3D scanner mounted on the robot.

The capturing step may comprise receiving, from the robot 3D scanner, data relating to at least a portion of the environment for constructing a 3D point cloud representing at least a portion of the environment. The comparing step may comprise comparing the 3D point cloud to the 3D model and, based upon the comparison, determining the position of the robot 3D scanner within the environment and determining the position of the robot based upon the determined position of the robot 3D scanner.

The robot 3D scanner may be positioned at a predetermined location or position on the robot such that the position of one or more other parts of the robot, and in particular the position of an end effector of the robot, can be determined based upon the determined position of the robot 3D scanner.

The 3D scanner may be a support 3D scanner provided on a support robot.

The capturing step may comprise receiving, from the support 3D scanner, data relating to the robot and at least a portion of the environment for constructing a 3D point cloud representing the robot and at least a portion of the environment. The comparing step may comprise comparing the 3D point cloud to the 3D model and, based upon the comparison, determining the position of the support 3D scanner within the environment and determining the position of the robot based upon the determined position of the support 3D scanner.

The method may further comprise determining a support movement trajectory for the support robot based upon the determined position of the robot and/or upon the determined movement trajectory for the robot. Determining a support movement trajectory for the support robot may comprise determining a support movement trajectory for the support robot which maintains the support 3D scanner in a position in which the robot is visible to the support 3D scanner.

The method may further comprise: receiving, from each of one or more 3D scanners located in the environment, data relating to at least a portion of the environment for constructing a respective calibrating 3D point cloud of the environment; and calibrating the one or more 3D scanners by comparing the one or more calibrating 3D point clouds to the 3D model and, based upon the comparison, determining the position of each of the one or more 3D scanners within the environment. The method may also comprise locating the one or more 3D scanners within the environment.

The calibrating point cloud may be same as the 3D point cloud of at least a portion of the environment and may also include the robot or data points relating to the robot. For example, the 3D scanners may be placed in the environment, the robot introduced into the environment, then the 3D point cloud taken by one or more of the scanners of both the environment and the robot. If calibrating point cloud is also used as the 3D point cloud in the capturing step, then the determination of the position of the robot may be based upon a comparing the calibrating point cloud with the 3D model to first determine the positions of the one or more 3D sensors, then to determine the position of the robot based upon the determined position or positions of the one or more sensors.

The method may further comprise defining a target location within the environment. Determining the position of the robot may further comprise determining the position of the robot relative to the target location. Determining the position of the robot relative to the target location may comprise one or more of determining a distance between the robot and the target location and/or determining a heading of the robot relative to the target location.

If it is determined that the robot is not at the target location, the movement trajectory of the robot may be determined so as to reduce the distance between the robot and the target location.

If it is determined that the robot is at the target location or in a working position proximate the target location, the movement trajectory may comprise maintaining a position of the robot or a robot operation trajectory for performing an operation at the target location. The operation may be a maintenance operation, such as repair, removal, replacement, adjustment, installation of one or more components of the gas turbine engine.

The virtual 3D model may comprise a plurality of virtual landmarks corresponding to real-world landmarks in the environment. Comparing the 3D point cloud to the 3D model may comprise comparing the 3D point cloud to the virtual landmarks to identify any features in the 3D point cloud which correspond to virtual landmarks.

The real world landmarks may comprise edge or vertex features of the environment.

The method may further comprise: iv) controlling movement of the robot on the movement trajectory. The method may also comprise moving the robot on the movement trajectory.

If a support robot is provided, then the method may further comprise controlling movement of the support robot on the movement trajectory and/or moving the support robot upon the support movement trajectory.

The method may comprise iterating steps i)-iv) to thereby incrementally navigate the robot within the environment.

The robot may comprise an end effector. Determining the position of the robot may comprise determining a position of the end effector. The end effector may be provided at a predetermined or fixed location relative to the 3D scanner.

The robot 3D scanner may be located at or proximate to the end effector.

The method may further comprise generating the 3D model of the environment or providing the 3D model of the environment. The 3D model may be generated or provided by: a) controlling scanning the environment and generating the 3D model of the environment based upon the scanning, and/or b) receiving CAD data relating to a CAD model of one or more components forming the environment and generating the 3D model of the environment based upon the received CAD data. In some examples the method may comprise manually scanning the environment to generate the 3D model of the environment.

Utilising a CAD model may comprise generating the 3D model based upon the CAD model or converting a CAD model into a 3D model.

According to a second aspect, there is provided a method of performing a maintenance operation in a gas turbine engine comprising controlling a robot according to the first aspect, wherein the robot is a scope tip robot, the environment is a confined space within the gas turbine engine, and the target location is a component of the gas turbine engine to be maintained.

Maintenance may comprise repair, removal, replacement, adjustment, installation, testing, or inspection of one or more components of the gas turbine engine.

The methods of the first and second aspects may comprise the use of multiple 3D scanners. For example, the robot may be provided with a robot 3D scanner, and a support robot with an associated support 3D scanner may also be provided in the same implementation. Furthermore, one or more 3D scanners may also be located in the environment in addition to the provision of a robot 3D scanner and/or a support 3D scanner.

According to a third aspect, there is provided a non-transitory computer-readable medium containing computer-readable instructions that, when read by a computer, cause performance of the method of any one of the preceding claims.

According to a fourth aspect, there is provided a control apparatus configured to perform the method of the first or second aspects above.

According to a fifth aspect, there is provided a robot control system comprising a robot and a control apparatus according to the fourth aspect described above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which:

FIG. 5 is a third example of a robot being controlled within an environment.

DETAILED DESCRIPTION

Figure 1:
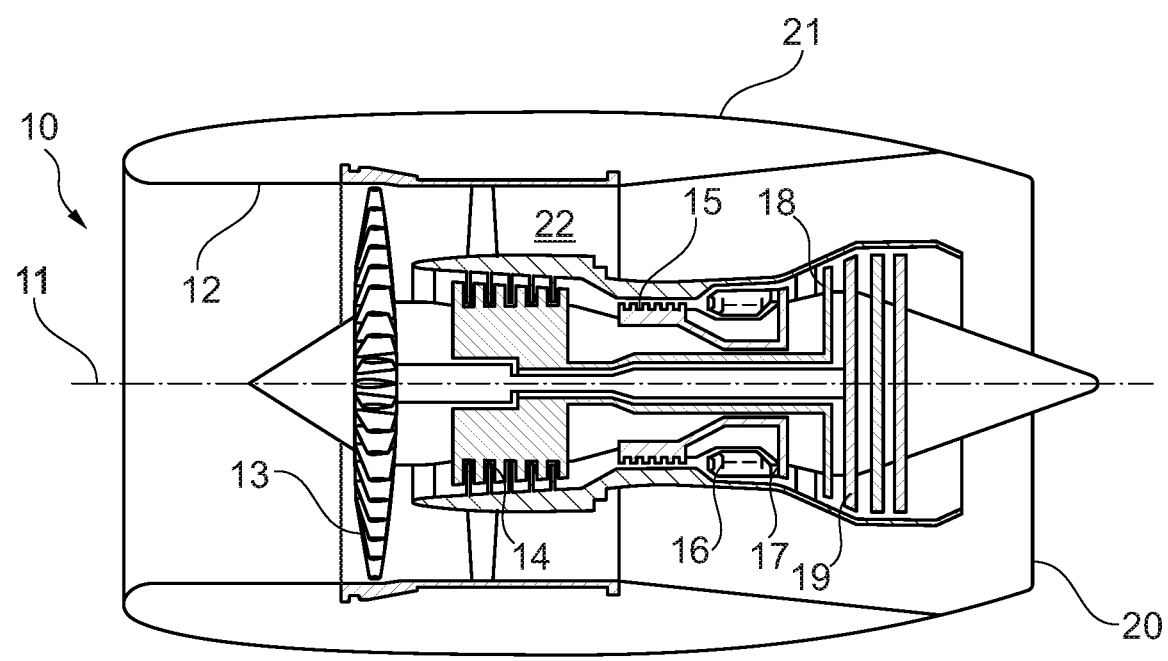
FIG. 1 is a schematic sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

During the engine's operational life, it is possible that certain internal components of the engine 10 may become damaged or require maintenance or inspection. For example, if a solid object is ingested by the engine 10 during its operation, this could cause surface damage to one or more blades or vanes of the fan 13, the compressors 14, 15, or the turbines 17, 18, 19, or to the surfaces of the engine core. This is not an exhaustive list of components which may be damaged or require maintenance, so it should be understood that any internal components could require repair, maintenance, or inspection. All possible operations which may be required on components of the engine may be referred to generally as "maintenance" in this disclosure for the purposes of brevity.

As gas turbine engines are complex and expensive, it is generally desirable to avoid down time and assembly/disassembly of the engine for maintenance. However, owing to the complex construction of the engine 10, its internal components may be difficult or impossible to reach by conventional methods without partial or complete disassembly of the engine.

Figure 2:
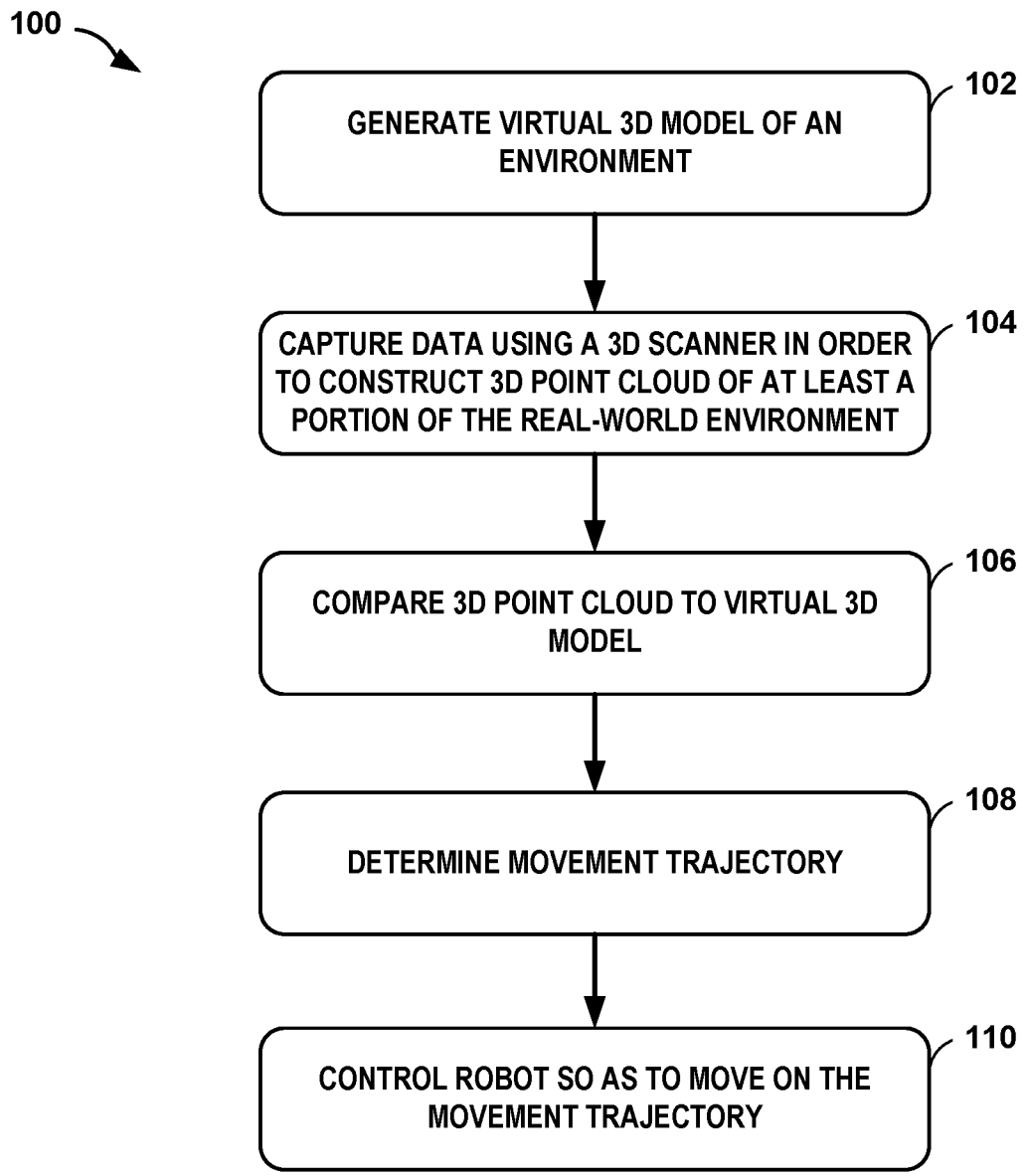
FIG. 2 is a schematic representation of a method of controlling a robot.

FIG. 2 schematically shows a flow diagram of a control method 100 for a robot. This control method 100 can be used to control a robot within an environment, such as the interior of the gas turbine engine 10.

In an optional first step 102 of the method 100, a virtual 3D model of an environment is generated. The virtual 3D model is a virtual representation of a real world environment in which the robot is to be controlled. The 3D model could be generated in any of a number of ways. In some examples, a computer-aided design (CAD) model of the environment may be available, which may be utilised directly as the 3D model or converted into a suitable 3D model. In other examples, the environment could be scanned using a 3D scanner in order to generate a 3D model representing the environment. The scanning could be performed manually by an operator or automatically. Regardless of the exact process by which the virtual 3D model is provided, it should be understood that the 3D model is an accurate 3D representation of the environment in which the robot is to operate, which is utilised in the control method described herein.

In the second step 104 of the method 100, data is captured using a 3D scanner in order to construct 3D point cloud of at least a portion of the real-world environment. The data is provided from the 3D scanner and received at, for example, a controller or control apparatus. The construction of the 3D point cloud may be performed by the 3D scanner itself, or at a controller or other location. Some example implementations of this capturing step are described with respect to FIGS. 3, 4, and 5 below. However, the 3D scanner utilised is operable to capture data for creating 3D point clouds representative of the environment viewed by the 3D scanner. For example, the 3D scanner may be a time-of flight scanner which generates a point cloud representative of a 3D position of a plurality of points of the environment which are in view of the scanner.

Generally, the 3D scanner is a sensorial device that captures and represents the surrounding environment in 3D space. The 3D scanner may utilise, for example, infrared (IR), LiDAR, LED, stereovision, phase measurement, cameras, etc. The 3D scanner may be of the passive or active type. Passive systems such as stereovision analyse the ambient lighting and capture two images from two different viewpoints, then use triangulation techniques to determine the pixels' correspondence between the images and form a 3D view. The active lighting systems such as IR systems emit light to illuminate the environment and analyse the reflected light to determine the 3D shapes of the objects calculated by triangulation. The 3D scanner may also be known as a 3D vision system. As will be described later, more than one 3D scanner and more than one different type of 3D scanner may be provided for capturing the environment in which the robot operates.

In the third step 106 of the method 100, the 3D point cloud constructed in the second step 104 is compared to a virtual 3D model of the environment, for example as generated in the first step 102. Based upon this comparison of the 3D point cloud and the 3D model, the position of the robot is determined (i.e. estimated). This determination may be performed in a number of ways, dependent upon the configuration of the robot and the 3D scanner or scanners. Generally, the virtual 3D model is a reference against which the 3D point cloud is compared so as to determine the robot position. A number of examples will be described below in FIGS. 3, 4, and 5.

In the fourth step 108 of the method 100, a movement trajectory for the robot is determined based upon the position of the robot determined in the third step 106.

In the optional fifth step 110 of the method 100, the robot is controlled so as to move on the movement trajectory determined in the fourth step 108. In this example, the robot is controlled to move automatically along the determined trajectory such that no user control input is required in order to control the navigation of the robot along the trajectory. In other examples, a user query may be issued in order to permit the robot to begin moving automatically along the determined trajectory.

In some examples, steps 104, 106, 108, 110 may be iterated repeatedly to incrementally move the robot along a movement path. The steps 104, 106, 108, 110 may be continuously iterated without user intervention, or a user input may be required after or during each iteration. The movement trajectory defined in step 108 may have a total length or extent which is dependent upon the determined position of the robot. For example, if it is clear from the determination of the robot position that there are no obstacles proximate the robot, a longer movement path may be determined so as to efficiently close a large distance between the robot and a target location. Conversely, if it is determined that the robot is proximate to one or more obstacles or the target location, the movement path may be shorter in order to accurately and carefully navigate the robot. In some examples, the determining capturing and determining steps 104, 106, 108 may be iterated while a movement step 110 is performed in order to adjust or correct the movement of the robot 'on the fly'

By virtue of the methods described herein, the control of a robot in an environment may be automated more efficiently and/or improved. The methods herein may particularly reduce the possibility of damage to the robot or to the environment in which the robot is operating.

In some examples, the method 100 may include the further step of defining a target location within the environment. The target location may be identified by a user and input into a control system wherein determining the position of the robot further comprises determining the position of the robot relative to the target location. Alternatively, the target location may be identified by a diagnostic system and automatically indicated to the controller of the robot.

If it is determined in the determining step 106 that the robot is not at the target location, then the movement trajectory of the robot can be determined in step 108 so as to reduce the distance between the robot and the target location. Conversely, if it is determined that the robot is at the target location or in a working position proximate the target location, then the movement trajectory determined in step 108 can comprise maintaining a position of the robot or performing a robot operation trajectory for performing a maintenance operation at the target location. In this way, once a target location has been specified to the controller of the robot, the entire control method and navigation of the robot may be performed automatically.

In the particular examples described below, the robot is a scope tip robot, the environment is a confined space within the gas turbine engine 10 and the target location is a component of the gas turbine engine 10 to be maintained.

Figure 3:
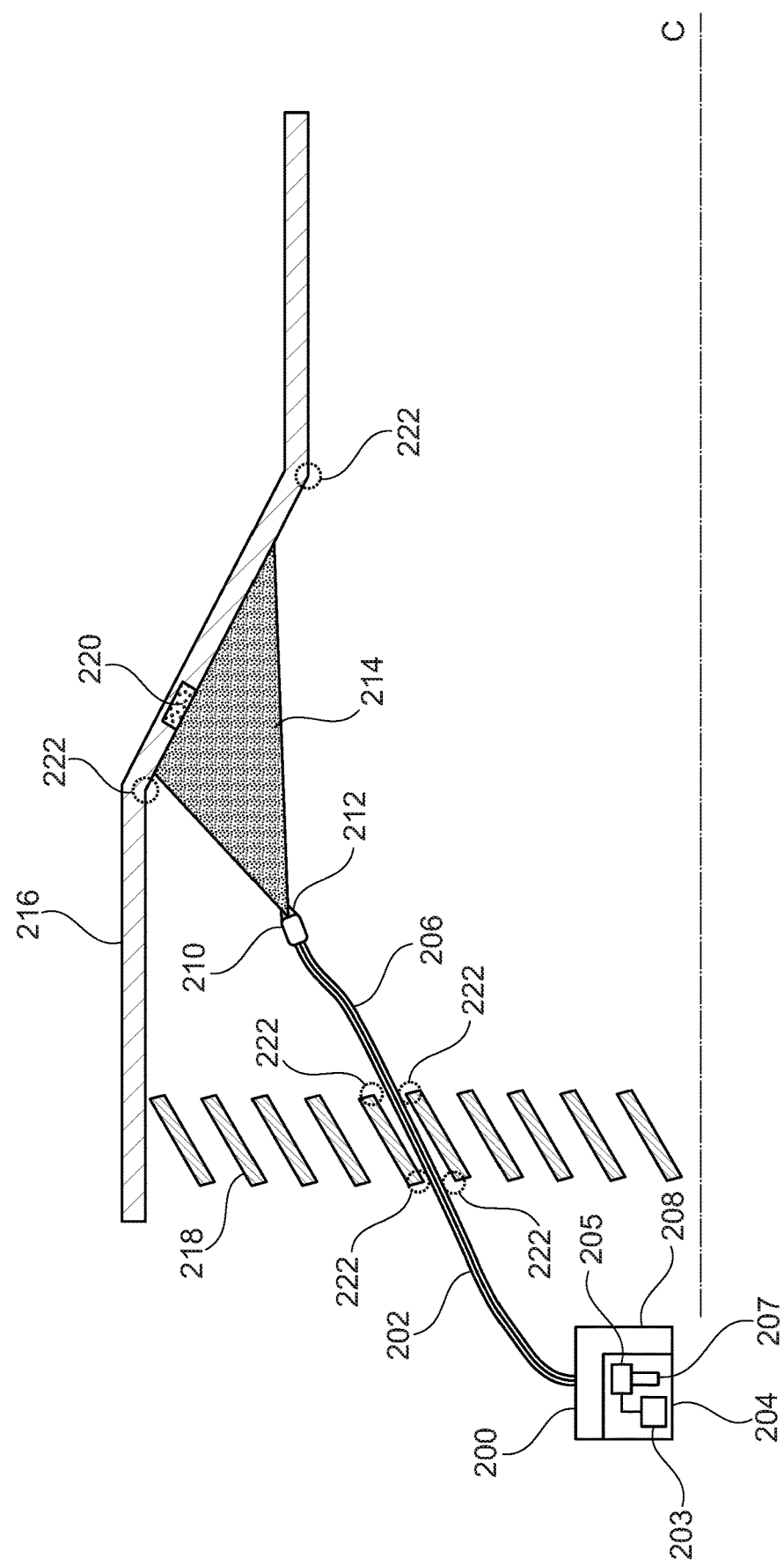
FIG. 3 is a first example of a robot being controlled within an environment.

Turning first to FIG. 3, a first example of a robot control system 200 is shown operating in an environment. The robot control system 200 comprises a robot 202, in the form of a scope tip robot, and a control apparatus 204 for the robot. The control apparatus 204 is shown in this case as being integral with the robot 202. It should be understood that some or all of the control apparatus 204 may be provided at a remote location and in communication with the robot control system 200 via a wired or wireless connection.

The control apparatus 204 includes a controller, a user input device (not shown), and an output device not shown. In some examples, the control apparatus 204 may be a module. As used herein, the wording 'module' refers to a device or apparatus where one or more features are included at a later time and, possibly, by another manufacturer or by an end user. For example, where the control apparatus 204 is a module, the apparatus may only include the controller, and the remaining features may be added by another manufacturer, or by an end user.

The controller, the user input device, and the output device may be coupled to one another via a wireless link and may consequently comprise transceiver circuitry and one or more antennas. Additionally or alternatively, the controller, the user input device and the output device may be coupled to one another via a wired link and may consequently comprise interface circuitry (such as a Universal Serial Bus (USB) socket). It should be appreciated that the controller, the user input device, and the output device may be coupled to one another via any combination of wired and wireless links.

The controller may comprise any suitable circuitry to cause performance of the methods described herein and as illustrated in FIG. 2. The controller may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In this example, the controller comprises at least one processor 203 and at least one memory 205. The memory 205 stores a computer program comprising computer readable instructions that, when read by the processor 203, causes performance of the methods described herein, and as illustrated in FIG. 2. The computer program may be software or firmware, or may be a combination of software and firmware.

The processor may be located on system 200, or may be located remote from the system 200, or may be distributed between the system 200 and a location remote from the system 200. The processor may include at least one microprocessor and may comprise a single core processor, may comprise multiple processor cores (such as a dual core processor or a quad core processor), or may comprise a plurality of processors (at least one of which may comprise multiple processor cores).

The memory may be located on the system 200, or may be located remote from the system 200, or may be distributed between the system 200 and a location remote from the system 200. The memory 205 may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The computer program may be stored on a non-transitory computer readable storage medium 207. The computer program may be transferred from the non-transitory computer readable storage medium 207 to the memory 205. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory 205 via a wireless signal or via a wired signal.

Input/output devices may be coupled to the system either directly or through intervening input/output controllers. Various communication adaptors may also be coupled to the controller to enable the control apparatus 204 to become coupled to other apparatus or remote printers or storage devices through intervening private or public networks. Non-limiting examples include modems and network adaptors of such communication adaptors.

The user input device may comprise any suitable device for enabling an operator to at least partially control the control apparatus 204. For example, the user input device may comprise one or more of a keyboard, a keypad, a touchpad, a touchscreen display, and a computer mouse. The controller is configured to receive signals from the user input device.

The output device may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller is arranged to provide a signal to the output device to cause the output device to convey information to the user.

It should be appreciated that the method illustrated in FIG. 2 may be performed 'offline' on data which has been measured and recorded previously. Alternatively it may be performed in 'real-time', that is, substantially at the same time that the data is measured.

The robot 202 has a multi-degree of freedom arm 206 having a proximal end connected to a base unit 208 and a distal end having a 3D scanner 210 and an end effector 212. The end effector 212 in this case is a gripping tool, but it will be understood that the end effector 212 may be a different tool, or comprise a number of different tools, including (but not limited to) repair tools, diagnostic tools, and installation or removal tools. The 3D scanner 210 is mounted on the robot arm 206 in a known position relative to the end effector 212 and relative to the robot arm 206 itself. The 3D scanner has a scanning field 214 which is schematically shown by a shaded area in FIG. 3. Generally, as the 3D scanner 210 is mounted on the robot 202 itself, it will be known as a robot 3D scanner 210. Thus, as the robot 202 moves, the scanner 210 at its distal end also moves. Importantly, it may not be possible for the 3D scanner 210 to view the robot arm 206 or the end effector 212 in its scanning field 214. Therefore, the position of the robot 202 must be derived from the scans of the environment itself.

In this example, the robot 3D scanner 210 faces forwards from the distal end of the robot arm 206. Of course, it should be understood that the scanner could additionally, or alternatively face in another direction, for example to the side, and still operate according to the methods described herein.

The environment in the example of FIG. 3 is the interior of a gas turbine engine 10 and, in particular, the core flow passage of an engine 10. For clarity, the engine 10 is simplified and shown schematically in FIG. 3. Nevertheless, it will be understood that FIG. 3 generally shows an upper-half cross section of an engine casing 216 which houses a plurality of vanes 218, which may be vanes of a stator of the compressor or turbine, or other airflow control vanes. Line C schematically indicates the centreline of the engine 10. As is illustrated in FIG. 3, the vanes 218 have relatively narrow spacings therebetween, which restrict the operational freedom of the robot 202.

A target location 220 is present on the casing 216. In this case, the target location is a defect, such as an area of damage, which requires repair. The target location 220 may have been identified by a diagnostic tool, or by inspection with a borescope, or by earlier inspection with the robot 202 itself. In other examples, the target location may be a foreign object, or an area for inspection or other maintenance.

As the environment in which the robot 202 is operating is a gas turbine engine 10, its internal structure is well known and pre-defined. A full CAD model of the engine's structure is available, so this can be utilised by the control apparatus 204 to improve the control of the robot 202. The CAD model of the casing 216 and the vanes 218 can be provided directly as a virtual 3D model of the environment to the control apparatus 204, or can be converted into a suitable virtual 3D model of the environment and provided to the control apparatus 204. In other examples where a pre-existing CAD model is not available, the internal structure of the casing 216 and vanes 218 could be scanned using a scanning device in order to generate a virtual 3D model of the environment and then provided to the control apparatus 204.

In an initial configuration, the system 200 is located proximate the environment and the virtual 3D model of the environment (i.e. the vanes 218 and the casing 216) and details of the target location are provided to the control apparatus 204. The robot 3D scanner 210 then scans the objects visible in its scanning field 214 and generates a 3D point cloud representative of the portion of the environment visible to the scanner 210.

The 3D point cloud constructed using data from the robot 3D scanner 210 is then provided to the control apparatus 204. The control apparatus 204, using fitting, registration, and/or surface matching algorithms, compares the scanned 3D point cloud with the virtual 3D model to calculate a 'best fit' location of the 3D scanner and, hence, the robot 202 itself. It should be understood that by the comparison of the data from the robot 3D scanner and the virtual 3D model of the environment, the viewpoint of the 3D scanner can be determined and therefore the position of the 3D scanner. The 3D point cloud may also be known as a depth map.

In order to assist with the comparison, the environment and, thus the virtual 3D model representing the environment, may comprise a number of landmarks 222. The landmarks 222 may be particularly distinctive elements of the environment which are easier for the fitting and registration algorithms to detect, such as edges or vertexes in the environment. In this case, the landmarks 222 are located at the edges of the vanes 218 through which the robot 202 is navigated, and at surfaces edges which bound the surface on which the target location 220 is located. The landmarks 222 may be pre-selected by an operator, or may be determined automatically by the control apparatus 204 (or another element of the control system) as the most distinctive features of the environment. Accordingly, when the data for the 3D point cloud is captured by the 3D scanner 210, the control apparatus 204 can identify the landmarks 222 from the 3D point cloud and thereby determine the location of the robot 202.

Once the robot 202 location has been determined by comparison, the control apparatus 204 can then, based upon the determined location of the robot 202, determine a suitable movement trajectory for the robot 202. The movement trajectory determined may be complex, for example a series of movements of the robot in multiple degrees of freedom to move the robot 202, or could be a single movement of a single joint of the robot 202.

In some examples, the scan, comparison, location determination, and trajectory determination steps may be performed for each and every joint movement of the robot 202, or in other examples, a series of movements may be performed between scanning steps. In this example, the movement trajectory will generally define a movement or series of movements of the robot 202 which will move the end effector 212 towards the target location 220 and, in particular, into an operating position at the target location 220. Of course, it should be understood that not every movement in a determined movement trajectory will move the robot 202 specifically towards the target location 220. In some positions, it may be required to move away from the target location 220 in order to navigate past an obstacle, such as a vane 218, which will then enable movement towards the target location 220. The robot movement trajectory determined may be defined so as to be collision free, provide an optimal path to the target location, and be within the robots kinematic constraints.

Once a suitable movement trajectory has been determined for the robot 202 by the control apparatus 204, the robot 202 is controlled by the control apparatus 204 in order to move it according to the determined movement trajectory. The movement trajectory will clearly define a starting and end position for the robot 202. It would generally be expected that if the robot is correctly actuated on the movement trajectory, that it would finish in the predicted end position. However, due to the multiple degrees of freedom and non-linear joints of the robot 202, it is possible that there may be some deviation from the movement trajectory and result in an end position of the robot 202 that is different from the predicted end position according to the movement trajectory. If no re-calibration were performed, then the errors over multiple movements could compound and result in large errors in robot positioning, which would result in contact with the environment and, therefore, damage to the robot or environment.

Accordingly, once the movement of the robot 202 on the movement trajectory is complete, a further scan is taken by the 3D scanner 210 and the robot 202 position determined. Any discrepancy between the predicted and actual position can then be accounted for and, in some cases, used to recalibrate the control apparatus 204 or robot 202.

Regardless of the movement trajectory length determined in each iteration, the scan, comparison, location determination, and trajectory determination steps are performed iteratively in order to move the robot end effector 212 towards a working position at the target location 220. In some cases, scans from the 3D scanner 210 may be taken constantly, even during movement, in order to provide active control feedback regarding the movement trajectory and actual movement of the robot, and any discrepancy therebetween.

Once the robot 202 is in a position suitable for operation at the target location 220, then the robot 202 can then perform the maintenance operation required.

Figure 4:
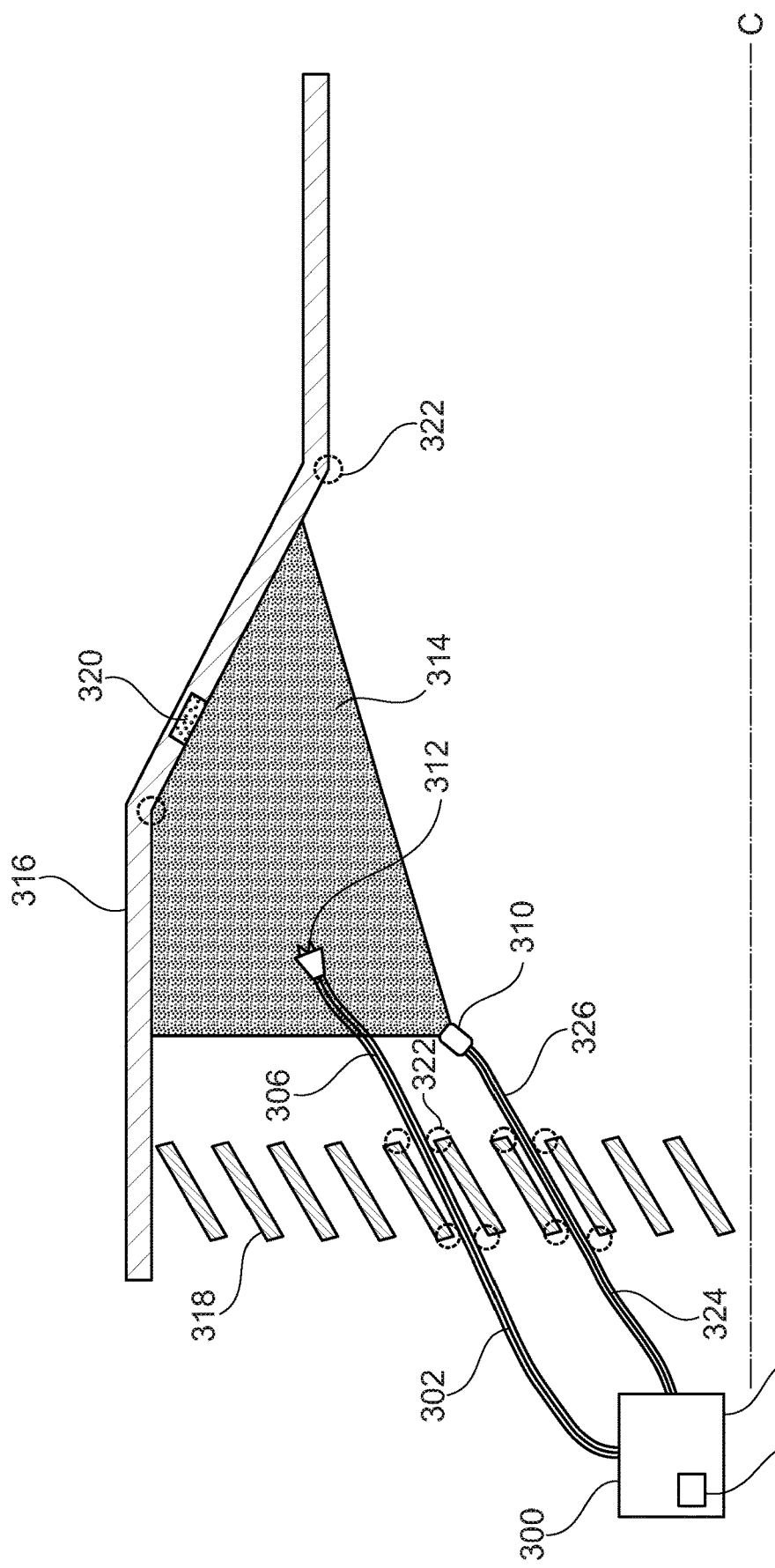
FIG. 4 is a second example of a robot being controlled within an environment.

A second example of a robot control system 300 is shown in FIG. 4. Like features between the examples of FIGS. 3 and 4 are indicated by reference numerals differing by 100.

Like the system 200, the system 300 has a robot 302 and a control apparatus 304. The control apparatus 304 may be constructed as set out for control apparatus 204 above. The robot 302 is for operation in an environment comprising in this case, a casing 316 and a plurality of vanes 318. The major difference between the system 200 of FIG. 3 and the system 300 of FIG. 4 is the provision of a support robot 324. The support robot 324 comprises has a multi-degree of freedom arm 326 having a proximal end connected to the base unit 308 and a distal end having a support 3D scanner 310. In the system 300, the main robot 302 does not comprise a 3D scanner and has only an end effector 312 at its distal end. In other examples, the main robot 302 may also comprise a 3D scanner.

When utilising the system 300, a virtual 3D model is provided to the control apparatus 304 as described with reference to system 200 of FIG. 2.

However, in system 300, the scan of the environment is performed by the support 3D scanner 310 provided on the support robot 324. As the 3D scanner is not a part of the main robot 302 itself, the support 3D scanner 310 can include the main robot 302 in its scanning field 314 and thereby produce a 3D point cloud which includes the main robot 302 and a portion of the environment.

The 3D point cloud (and/or underlying data) captured by the support 3D scanner 310 is then provided to the control apparatus 304. The control apparatus 304, using similar fitting and registration algorithms, compares the 3D point cloud with the virtual 3D model to calculate a 'best fit' location of the support 3D scanner based upon the information in the 3D point cloud relating to the environment and, hence, the support robot 324 itself. However, as a further step, the control apparatus 304, having determined the position of the support robot 324, can also utilise this information to determine the position of the main robot 302 relative to the support robot 324. In particular, as the support robot 324 location is known, and the point cloud generated from the data of the support 3D scanner provides information regarding the relative positioning of the support 3D scanner and the main robot 302, the main robot 302 position can be derived by the control apparatus 304.

Once the main robot 302 position is determined, then a movement trajectory for the main robot 302 can be determined as set out above. However, in addition, a support movement trajectory can also be determined based upon the determined position of the support robot 324, the main robot 302, and the main robot movement trajectory. The support robot movement trajectory will generally be determined so as to ensure that the support 3D scanner tracks the movement of the main robot 302, to thereby ensure that the position and movements of the main robot 302 can be determined as set out above. The support movement trajectory may be determined in a similar manner to the main robot movement trajectory as set out above, but the 'target location' for the support robot 324 will be a transitory position in which the support 3D scanner has both the main robot 302 and at least a portion of the environment.

Once the main robot movement trajectory and the support robot movement trajectory have been determined, the main robot 302 and support robot 324 can be moved on their respective trajectories as described in relation to FIG. 3. The scan, comparison, location determination, and trajectory determination steps may be iterated to move the main robot 302 towards the target location 320 and the support robot 324 in a support position so as to enable determination of the main robot 302 position. Advantageously, where a separate support robot 324 is utilised, the main robot 302 may be able to carry more tools or perform operations which might be difficult is the main robot were relaying on its own 3D scanner.

A third example of a robot control system 400 is shown in FIG. 5. Like features between the system 200 of FIG. 3 and the system 400 of FIG. 5 are indicated by reference numerals differing by 200.

In system 400, the main robot 402 comprises a multi-degree-of-freedom arm 406 having an end effector 412 at a distal end thereof. In this example, no 3D scanner is provided on the main robot 402 itself, although in other examples it may be provided.

In order to utilise the system 400, a plurality of static 3D scanners 410 are located in the environment in set positions. In this example, a first 3D scanner 410a is provided with its scanning field 414a directed at the vanes 418 in order to scan the environment and the robot 402 in this location. Second and third 3D scanners 410b and 410c are located within the casing 416 itself and are generally aimed in opposing directions such that their respective scanning fields 414b, 414c provide views of the entire likely robot path between the base 408 and the target location 420.

The static scanners 410 can be located without a precise record of their position having been taken, as the system 400 is operable to determine the position of each of the scanners in a calibration operation as follows.

Like the examples described in FIGS. 3 and 4 above, a virtual 3D model of the environment is provided to the control apparatus 404. The control apparatus 404 may be constructed as set out for control apparatus 204 above. Before the entry of the robot 402 into the environment, each of the static 3D scanners captures data for producing a calibrating 3D point cloud of its view. Using the position determination techniques for the robot 3D scanner 210 and the support 3D scanner 310 described above, the calibrating 3D point clouds constructed from the scanners 410 can be compared to the virtual 3D model of the environment and, therefore, the position of each of the static 3D scanners 410 can be determined in order to calibrate the system 400.

Owing to the positioning of the scanners 410, the robot 402 is in the scanning field 414 of at least one of the scanners

410 at all times along its navigation course from the base 408 to the target location 420. The static 3D scanners 410, when the robot is located in their scanning field 414, can capture data for 3D point clouds of the robot 402 in the environment. As the position of each scanner 410 is known from the calibration operation, and the position of the robot 402 relative to the scanner 410 can be determined from the 3D point clouds from by the scanners 410, the position of the robot 402 can be determined.

As described above, based upon the determined position of the robot 402, a movement trajectory for the robot 402 can be determined.

In particular, if more than one of the static 3D scanners have the robot 402 in their respective scanning field 414, then the position of the robot 402 can be determined based upon the captured data from both scanners and compared to verify the determined position.

It should be understood that elements of the systems 200, 300, and 400 can be combined. For example, a system may be provided having a main robot with a robot 3D scanner, a support robot having a support 3D scanner, and static 3D scanners located in the environment, or any combination thereof. This may enable verification and checking between the determined position of the robot from different scanners, and may also provide redundancy in the system in case of failure of one or more of the other scanners.

The disclosed methods may be particularly useful for operating robots in a known and predetermined environment, such as the interior of a gas turbine engine. Where an environment is known in intricate detail (for example, by a CAD model on which the real-world environment is based or by a detailed scan of the environment prior to robot entry), a 3D model of that environment can be used to educate the positioning and control of the robot so as to provide an improved control method which may reduce or avoid the need for manual user control input, improve movement efficiency and power usage, and reduce the chance of damage to the environment and/or the robot or robots operating in the environment. This is particularly the case in confined and/or delicate environments, such as the interior of a gas turbine engine, where even minor damage could be, at best, extremely expensive to remedy and, at worst, catastrophic and highly dangerous.

Accordingly, the systems and methods disclosed herein, may also be applied to other fields in which remote robot assistance is desirable and where a robot is operating in a confined, but well-known environment in which a virtual 3D model is either already available or can be readily captured. For example, the examples described herein would equally be applied in technology areas in which in-field inspection and repair of high value installed infrastructure is common, such as oil and gas, pharmaceuticals, wind power, nuclear power, marine, land based gas turbines, power stations etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of controlling a robot within an environment comprising:
   i) receiving, from a 3D scanner mounted on a multi-degree of freedom arm of the robot, data relating to at least a portion of the environment for constructing a 3D point cloud representing at least the portion of the environment;
   ii) comparing the 3D point cloud to a virtual 3D model of the environment and, based upon the comparison, determining a position of the 3D scanner, and, based on the determined position of the 3D scanner, determining a position of an end effector attached to the multi-degree of freedom arm;
   iii) determining a movement trajectory for the robot based upon the determined position of the end effector; and
   iv) controlling movement of the robot on the movement trajectory.

2. The method as claimed in claim 1, wherein:
   the receiving step comprises receiving, from the 3D scanner, data relating to at least the portion of the environment for constructing the 3D point cloud representing at least the portion of the environment; and
   the comparing step comprises comparing the 3D point cloud to the 3D model and, based upon the comparison, determining the position of the robot 3D scanner within the environment and determining the position of the robot based upon the determined position of the 3D scanner.

3. The method as claimed in claim 1, wherein the 3D scanner is a support 3D scanner provided on a support robot.

4. The method as claimed in claim 3, wherein:
   the receiving step comprises receiving, from the support 3D scanner, data relating to the robot and at least a portion of the environment for constructing a 3D point cloud representing the robot and at least a portion of the environment; and
   the comparing step comprises comparing the 3D point cloud to the 3D model and, based upon the comparison, determining the position of the support 3D scanner within the environment and determining the position of the robot based upon the determined position of the support 3D scanner.

5. The method as claimed in claim 1, wherein the method further comprises:
   receiving, from each of one or more 3D scanners located within the environment, data relating to at least a portion of the environment for constructing a respective calibrating 3D point cloud of the environment, and
   calibrating the one or more 3D scanners by comparing the one or more calibrating 3D point clouds to the 3D model and, based upon the comparison, determining the position of each of the one or more 3D scanners within the environment.

6. The method as claimed in claim 1, further comprising:
   defining a target location within the environment,
   wherein determining the position of the end effector further comprises determining the position of the end effector relative to the target location.

7. The method as claimed in claim 6, wherein, if it is determined that the end effector is not at the target location, the movement trajectory of the end effector is determined so as to reduce the distance between the end effector and the target location.

8. The method as claimed in claim 6, wherein, if it is determined that the end effector is at the target location or in a working position proximate the target location, the movement trajectory comprises maintaining a position of the end effector or generating a robot operation trajectory for performing an operation at the target location.

9. The method as claimed in claim 1, wherein the virtual 3D model comprises a plurality of virtual landmarks corresponding to real-world landmarks in the environment and wherein comparing the 3D point cloud to the 3D model comprises comparing the 3D point cloud to the virtual landmarks to identify any features in the 3D point cloud which correspond to virtual landmarks.

10. The method as claimed in claim 1, further comprising iterating steps i)-iv) to thereby incrementally navigate the robot within the environment.

11. The method as claimed in claim 1, further comprising generating the virtual 3D model of the environment by:
   a) controlling scanning of the environment and generating a 3D model of the environment based upon the scanning; and/or
   b) receiving CAD data relating to a CAD model of one or more components forming the environment and generating a 3D model of the environment based upon the received CAD data.

12. A method of performing a maintenance operation in a gas turbine engine comprising controlling the robot according to claim 1, wherein:
   the robot is a scope tip robot;
   the environment is a confined space within the gas turbine engine; and
   the target location is a component of the gas turbine engine to be maintained.

13. A non-transitory computer-readable medium containing computer-readable instructions that, when read by a computer, cause performance of the method of claim 1.

14. A control apparatus configured to perform the method of claim 1.

15. A robot control system comprising the robot and the control apparatus according to claim 14.

* * * * *